United States Patent [19]

Cloud

[11] Patent Number: 4,644,682
[45] Date of Patent: Feb. 24, 1987

[54] TRAP HAULING AND EJECTING METHOD

[76] Inventor: Ernest Cloud, 2846 Old Mayport Rd., Atlantic Beach, Fla. 32233

[21] Appl. No.: 860,643

[22] Filed: May 8, 1986

Related U.S. Application Data

[62] Division of Ser. No. 577,019, Feb. 6, 1984, Pat. No. 4,588,166.

[51] Int. Cl.⁴ .................. A01K 79/00; A01K 91/02
[52] U.S. Cl. .......................................... 43/100; 43/4.5; 43/6.5; 43/19
[58] Field of Search ............... 43/4.5, 6.5, 100, 19, 43/102; 242/81; 254/371, 374, 288

[56] References Cited

U.S. PATENT DOCUMENTS

| | | | |
|---|---|---|---|
| 3,831,311 | 8/1974 | Cushing | 43/6.5 |
| 3,903,632 | 9/1975 | Tison et al. | 43/6.5 |
| 4,272,904 | 6/1981 | Francklyn | 43/102 X |
| 4,354,667 | 10/1982 | Svendsen | 254/371 X |

FOREIGN PATENT DOCUMENTS

| | | | |
|---|---|---|---|
| 792981 | 8/1968 | Canada | 43/102 |
| 426636 | 11/1974 | U.S.S.R. | 43/19 |

Primary Examiner—Nicholas P. Godici
Assistant Examiner—Carmine Cuda
Attorney, Agent, or Firm—Paul H. Gallagher

[57] ABSTRACT

A winch includes a spindle plate having a plurality of pins fixed thereon, the pins forming the core of a winch and the line of the trap is wound on the pins. An ejector plate is axially slidable for ejecting the wound line from the pins into the water. The space surrounded by the pins forms a basket in which the buoy is put in the winding-in step, this securing the line to the pins for the winding. The ejection step is produced by a slidable ejection shaft carrying the ejection plate, and driven by a motor. An advancing shaft is carried by and within the ejection shaft, and at the final movement of the ejection shaft, the advancing shaft ejects the buoy clear of the line coil. The advancing shaft is moved relative to the ejection shaft, by a cam carried by the ejection shaft and engaging a fixed trip unit.

2 Claims, 8 Drawing Figures

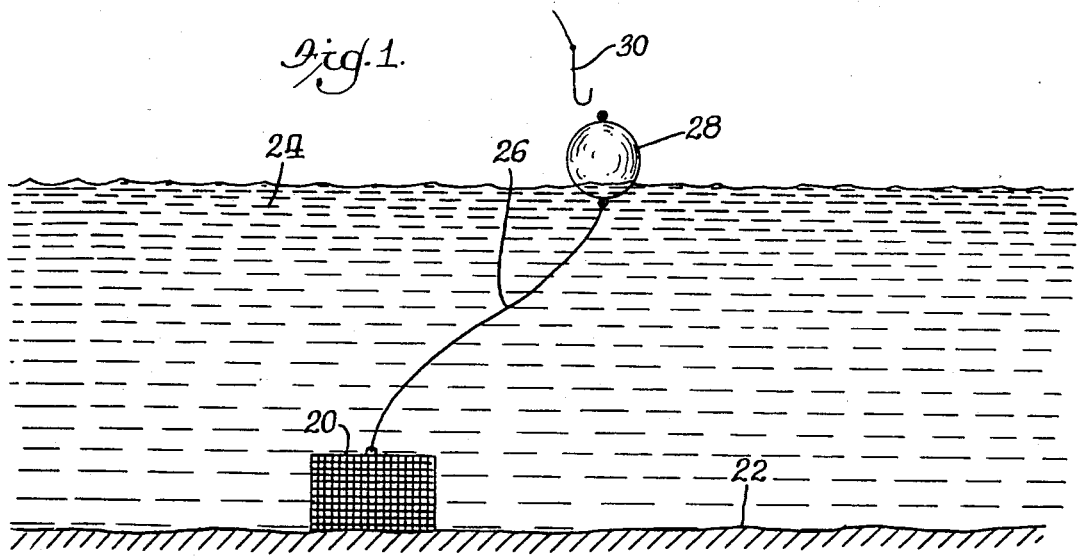
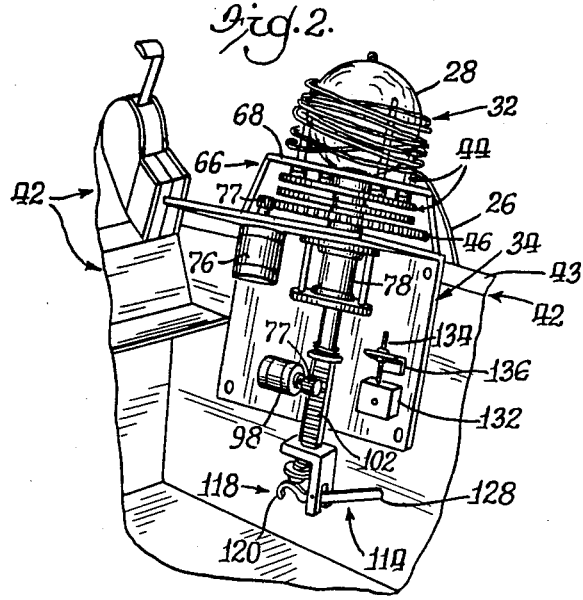
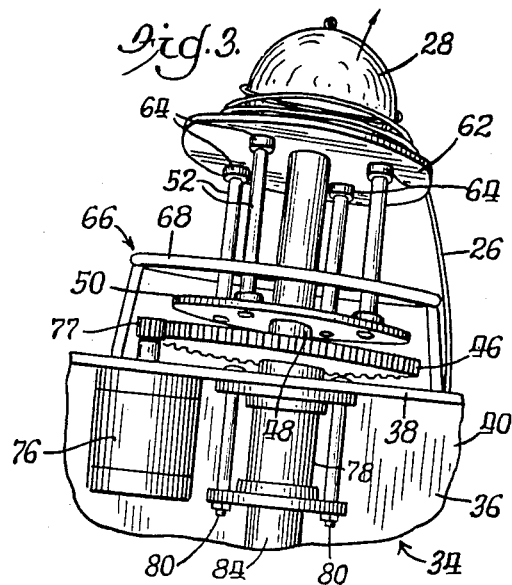

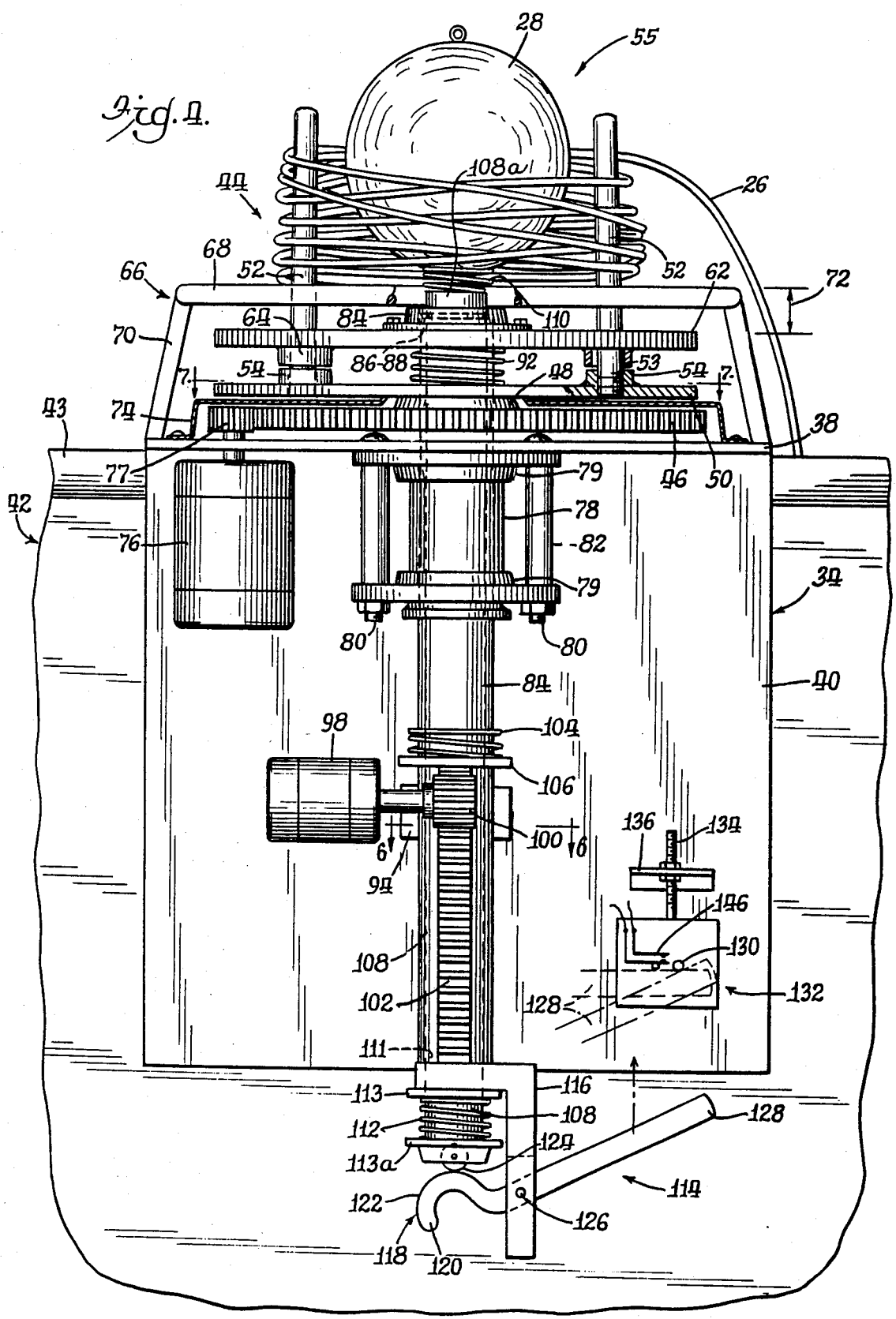

TRAP HAULING AND EJECTING METHOD

This is a division of my prior and co-pending application, Ser. No. 577,019, filed Feb. 6, 1984 and now U.S. Pat. No. 4,588,166, issued May 13, 1986.

FIELD OF THE INVENTION

The invention resides in the fisherman's field and what is known as commercial trap seafood fishing, and involves a trap hauler. This fishing takes place for example in coastal and tidal waters, and rivers, etc. In such fishing a trap is placed in the water, with a line attached thereto leading to a buoy, the trap catching for example crabs, etc. The fisherman usually has a number of such traps, and in harvesting, he grasps the line, pulls the trap up, removes the catch from the trap, and then throws the trap back into the water. Sometimes the trap is drawn in manually, and sometimes by a power winch. Such manual operation is time consuming and tiring, and in the use of the power winch, the line easily becomes tangled, and it is also time consuming.

OBJECTS OF THE INVENTION

A broad object of the invention is to provide a method of fishing, particularly in the use of a trap hauler, and such having the following novel features and advantages:

1. It is a simple and easy method for eliminating most of the manual handling of traps.
2. It eliminates the tangling of the line of the trap, usually encountered heretofore in hauling traps.
3. It is operable and effective for ejecting the coiled-in-line into the water, and quickly so, without tangling the line.
4. It is extremely rapid in its operation, effecting a great saving of time, most significant in the case of one man handling a large number of traps.

DESCRIPTION OF A PREFERRED EMBODIMENT

In the drawings,

FIG. 1 is a semi-diagrammatic view of a trap in position in the water, and a buoy connected thereto;

FIG. 2 is a perspective view of a trap hauler to which the method of the invention is applicable, showing the trap line wound thereon and the buoy in place therein, and in retracted position;

FIG. 3 is a perspective view similar to FIG. 2 but showing the device in ejecting position, just before the final ejection step;

FIG. 4 is a vertical axial sectional view of the device in retracted or lowered position, corresponding to that of FIG. 2;

FIG. 6 is a view taken at line 6—6 of FIG. 4;

FIG. 7 is a top face view of the ejection plate, taken at line 7—7 of FIG. 4; and FIG. 8 is a diagram of the electrical circuit used in the device.

Figure 5:
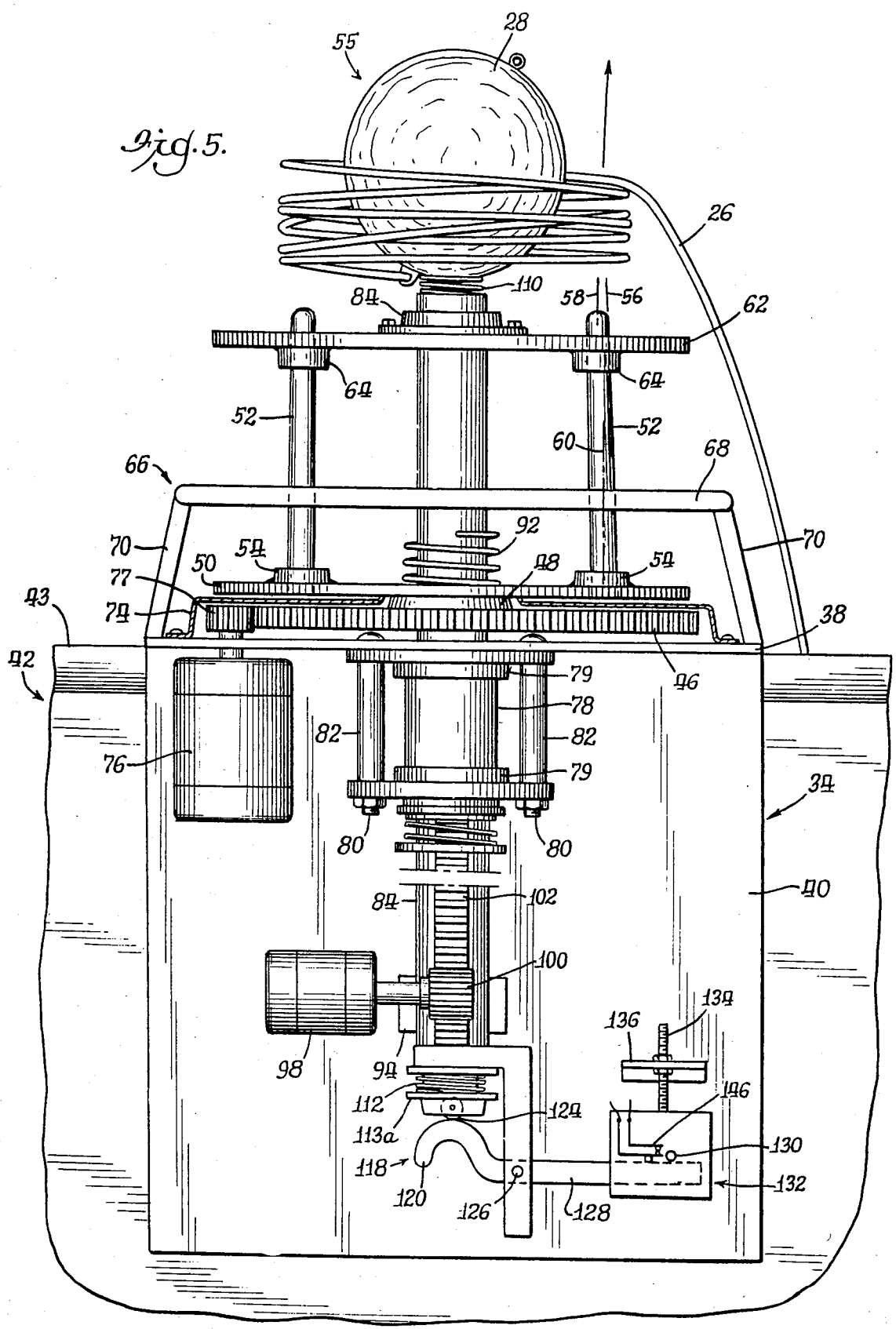
FIG. 5 is a view similar to FIG. 4, but showing the parts in upper or ejecting position, corresponding to that of FIG. 3.

The device illustrated, and to which the method of the invention is applicable, includes a trap hauler, and an ejector. A device for pulling up, or pulling in, a trap is known as a hauler, such hauler including a winch on which the trap line is wound for so pulling it in. Trap haulers of various kinds have been known heretofore, but the feature of ejecting the line connected to the trap, is entirely new. The trap hauler itself, that performs the specific step of hauling in the trap, also includes novel construction, and is covered by my co-pending application mentioned above.

Referring in detail to the accompanying drawings, attention is directed first to FIG. 1 showing a trap 20 in position in the water, resting on the bottom 22 of the body of water, such as a stream, small lake, etc., indicated at 24. A line 26 connects the trap to a buoy 28 floating on the water. In the use of the device, the buoy of course indicates the position of the trap, and it holds the line in position so that it can be grasped by the user by a convenient tool, such as a hook 30 of known kind. The user grasps the line and pulls in the trap, either manually or by a power winch. When the line is fully drawn up, with the trap, he grasps the trap, lifts it into the boat, removes the catch, and then throws the trap back into the water. This last step, heretofore, occasioned much inconvenience and consumption of time, particularly in handling the line. In the case where the trap was pulled in manually, a great amount of time was required and the line usually dropped loosely on the bottom of the boat and it required considerable time to lower it back into the water, and very often it became tangled. Also in the case of the winch, it was not always possible to pull the line off of the winch without tangling it. In this step also the operation was very time consuming.

The device illustrated is indicated in its entirety at 32, and it includes a frame 34 on which the other parts are mounted, and by which the device is mounted on the boat. The frame includes an angle member 36 having a top horizontal portion or shelf 38 and a rear downwardly extending portion 40 by which it is directly mounted on the boat, as indicated at 42. The device may be mounted at any convenient location, such as on the gunwale 43 in position so that the shelf 38 is adjacent to or slightly above the gunwale and the uppwer parts of the device are thereby also above the gunwale.

Positioned above the shelf 38 is what is referred to generally as a winch or reel 44 and includes a ring gear 46 having a hub 48, and mounted for rotation. Mounted on the hub 48 and thus carried by the ring gear, is a spindle plate 50 for receiving an ejection shaft as referred to again hereinbelow.

Carried by the spindle plate 50 are a plurality of pins 52 mounted as by threading them into holes 53 (FIG. 4) in units 54 secured to the plate as by welding. The pins 52 together form a core or spool or spindle, as of a reel, for winding up the trap line, as will be referred to again hereinbelow, and they are spaced apart, forming a "basket" 55 therebetween, for receiving the buoy, also in a manner referred to hereinbelow. The pins are each tapered, decreasing in diameter upwardly as indicated by the line 56 (FIG. 5) which lies in the surface of the pin and thus at an angle relative to the line 58 forming the axis of the pin. The pins themselves, bodily, also are inclined inwardly as indicated by the relation between the axis line 58 and the vertical line 60. This results in an overall tapered outer surface of the pins taken together, and a corresponding tapered surface of the core of the reel on which the line is wound. The spindle plate 50 may be provided with a plurality of series of holes 53 (FIG. 7), arranged in circles of different diameters, for placing the pins for selectively different size cores.

An ejection plate 62 is provided, slidable on the pins 52, having holes to receive the pins, and collars 64 in register with the holes, the collars holding the plate in place on the pins in the upper ejecting position while the upper surface of the plate is near, or even above, the upper ends of the pins (FIG. 3).

FIG. 4 shows that parts in position for winding up the trap line and in this position, the ejection plate 62 is in lowered position, and to guide the line onto the pins, a guide rail 66 is provided, which includes a ring 68 and legs 70 secured to the shelf 38. The ring surrounds the pins, at a position adjacent to the outer edge of the ejection plate, axially spaced from the lower position of the plate, this distance being indicated at 72. In winding the trap line, the line is held out of this space and above it, by the guide rail 66.

A water deflecting shield 74 is mounted on the frame, covering the ring gear 46 and other elements.

The ring gear 46, and the components carried thereby, are rotated by a suitable drive means, such as an electrical motor 76 having a pinon 77 on its drive shaft meshing with the ring gear. The motor 76 is suitably mounted on the frame 34.

The rotatable ring gear 46 is fixed against axial movement, having a tubular hub shaft 78 mounted in opposed bearings 79 which are secured together by bolts 80, with spacers 82 surrounding the bolts, the bolts also securing the assembly of hub shaft and bearings to the shelf 38.

A tubular ejection shaft 84 is slidably mounted in the tubular hub shaft 78, and carries other elements as referred to below, and is secured to the ejection plate 62, in a bearing 85 on the plate, enabling relative rotation by means of a circumferential keyway 86 in the shaft and key 88 in the bearing. The shaft may extend through the bearing. The ejection plate 62 and ejection shaft 84 move vertically as a unit, and a cushion compression spring 92 surrounds the shaft and is supported by the spindle plate 50 engaged by the plate upon descent of the unit.

The ejection shaft 84 is held against rotation by a bracket 94 (see particularly FIG. 6) in the form of a channel, the shaft having pieces 96 secured thereto to give it a non-circular shape at that location.

The ejection shaft 84 is raised preferably by an electrical motor 98 having a pinion 100 on its drive shaft meshing with a rack 102 secured on the ejection shaft.

An impact and cushion spring 104 is placed on the shaft 84, above a collar 106 secured to the shaft, which cushions the impact of the shaft against the bearing 79, at the top of ejection movement.

A buoy lead advancing shaft 108 is slidably mounted in the tubular ejection shaft 84, extending upwardly through the ejection plate 62, at 108a, and a compression spring 110 is mounted on the top of it, which is engaged by the buoy when the buoy is in the basket 55. A key and vertical keyway 111 accommodates sliding movement between the shafts 108, 84, while preventing rotational movement therebetween. A compression spring 112 surrounds the shaft being interposed between collars 113, 113a, on the shafts 84, 108.

In the operation of the device, which will be described in detail hereinbelow, the ejection shaft 84 is raised, carrying the advancing shaft 108 with it, the shafts having suitable interconnection for that purose. As the shaft 84 approaches the end of its movement, the shaft 108 is raised further, by independent control, so that the upper end 108a engages the buoy. For this purpose, an actuator 114 is provided, which includes a bracket 116 fixedly mounted on and carried by the shaft 84, and a cam member 118 carried by the bracket. The cam member has a cam element 120 with a surface 122 engaging a follower roller 123 in the shaft, and is pivoted at 126 in the bracket and has an arm 128.

As the shafts 108, 84, and actuator 114 rise, the cam member arm 128 engages a stop pin 130 in a trip unit 132, this action rotating the cam clockwise and thereby raising the shaft 108 within and relative to the shaft 84.

The trip unit includes means for vertical adjustment, such as a screw 134 threaded in a bracket 136 fixed on the frame. The unit 132 also includes electrical switch contacts 146 actuated and closed by the arm 128 in certain timed relationship to engaging the pin 130 as referred to below.

Attention is directed to the circuit of FIG. 8 in conjunction with the specific movement of the parts in the use of the device. The motor 76 identified above is shown in the circuit, controlled by a normally open manually actuated switch 140.

In the operation of the device, the user grabs the trap line 26 with the hook 30, and manually grasps the line and buoy, and throws the buoy into the basket 55. The buoy in this position serves to secure the line to the core of the winch, i.e., the core formed by the pins 52, and the reel (plate 50 with the pins) is then rotated, by manually closing the switch 140 and thereby operating the motor 76, whereby the line is wound on the pins 52, until the trap is drawn in within manual reach; the switch 140 is then released, stopping the motor, the trap is grasped, and the catch withdrawn from the trap.

Following the foregoing, the operator ejects the line coiled on the pins 52, and for this step, reference is again made to the circuit of FIG. 8. The motor 98, for driving the ejection shaft (FIGS. 4 and 5) is shown, controlled by a normally open manual switch 142. Upon closing of this switch by the operator, a relay 144 is energized, closing contacts 144a establishing a holding circuit for the motor which thereby continues to run. This raises the ejection shaft 84, carrying the advancing shaft 108 with it. The ejection shaft 84 raises the ejection plate 62 to the limit provided. In this step, the plate engages the coil of the line on the pins 52, but does so only after the plate advances the distance 72 (FIG. 4), and it thereby produces a sudden impact on the coil and effectively releases it from the pins, the line being tightly wound thereon because of the resistance of the trap in being reeled in. The line is usually in the form of a rope, having a high friction surface, and it is wound somewhat randomly on the pins, i.e., the strands of each additional turn cross over those under it. This relationship of the turns of the rope forms a tight coil, securing it firmly on the pins and thereby assuring its remaining in place, but this same feature would work against its ejection, but the taper of the pins greatly facilitates its ejection.

The taper on the pins enables the coil to be moved along progressively easily. The plate is raised to a position where its upper surface is at least as high as the upper ends of the pins, enabling the coil to slide off into the water. However, the plate is raised fast, and stopped abruptly, by the spring 104 engaging the bearing 79, and even if the plate should not be raised fully to the top of the pins, the coil would be thrown clear of the pins. The device is mounted in a position inclined outwardly from the vertical to assure that the line and buoy are thrown clear of the boat.

In this raising movement of the ejection shaft 84 and the advancing shaft 108, the actuator 114 engages the stop pin 130, and the cam member 118 swung clockwise, the advancing shaft 108 is by that action raised still further and relative to the shaft 84. The compression spring 110 directly engages the buoy 28 in this action and is thereby compressed, and upon the advancing shaft stopping, the spring extends by quick inertia release and throws the buoy clear of the line. The buoy and the line are then in the water, and the user throws the trap back into the water.

Upon the shaft 108 reaching the predetermined height limit, and the actuation of the cam arm 128, the cam arm engages and closes the normally open switch 146. This switch is shown in FIGS. 4 and 5, and is included in the circuit of FIG. 8. Upon closure of this switch as mentioned, a relay 148 is actuated, opening a set of normally closed contacts 148a, breaking the holding circuit to the motor 98, and interrupting the entire control circuit.

The drive means, including the motors 76 and 98, and related dirve transmitting elements, that are illustrated, represent one of many forms of drive means. For example, both phases of the drive may be manually controlled—in the case of pulling in the trap, the user can easily release the switch when the trap is within arm's reach, and in the case of the ejection operation, he can easily judge when to release a switch he is manually holding closed because the compression spring 104 absorbs substantial overrun. The entire ejection operation takes place in only a few seconds, probably three or less, and the user quickly senses how long to hold the switch closed. Other kinds of drive motors also may be used instead, such as gasoline engines.

In the use of this apparatus, in winding the line on the winch, the line is kept out of contact with the boat. This is used in the sense that the line is not dropped in a pile in the boat although it may indirectly contact the boat in manipulating it.

I claim:

1. A method of handling a fisherman's trap wherein the trap is positioned in the water and a line connects a buoy to the trap, comprising the steps, withdrawing the buoy from the water and utilizing the buoy to secure the line to a winch mounted on a boat, then; winding said line into a coil on said winch, then; placing the trap on the boat for removal of its contents and/or insertion of bait, then; ejecting the buoy and the entire coil consisting of substantially the entire line into the water independent of each other, then; discarding the trap into the water, in conjunction with, but after ejection of the buoy and the line.

2. A method according to claim 1 wherein,
   in the step of winding the line on the winch, the line is held essentially out of direct contact with the boat.

* * * * *